(12) United States Patent
Van Slembrouck (10) Patent No.: US 8,205,168 B1
(45) Date of Patent: Jun. 19, 2012

(54) METHODS AND SYSTEMS FOR PAGE NAVIGATION OF DYNAMICALLY LAID-OUT SYSTEMS

(75) Inventor: Justin Van Slembrouck, Bronx, NY (US)

(73) Assignee: Adobe Systems Incorporated, San Jose, CA (US)

( * ) Notice: Subject to any disclaimer, the term of this patent is extended or adjusted under 35 U.S.C. 154(b) by 356 days.

(21) Appl. No.: 12/325,337

(22) Filed: Dec. 1, 2008

(51) Int. Cl.
*G06F 3/048* (2006.01)

(52) U.S. Cl. ........................................ 715/786; 715/784

(58) Field of Classification Search .................. 715/839, 715/970, 804, 854, 810, 733, 784, 785, 786, 715/787
See application file for complete search history.

(56) References Cited

U.S. PATENT DOCUMENTS

| | | | | |
|---|---|---|---|---|
| 5,510,808 | A * | 4/1996 | Cina et al. ...................... | 345/684 |
| 5,943,052 | A * | 8/1999 | Allen et al. .................... | 715/787 |
| 6,191,785 | B1 * | 2/2001 | Bertram et al. ................ | 715/764 |
| 6,590,594 | B2 * | 7/2003 | Bates et al. ................... | 715/784 |
| 7,415,666 | B2 * | 8/2008 | Sellers et al. ................. | 715/251 |
| 7,490,297 | B2 * | 2/2009 | Bates et al. ................... | 715/784 |
| 7,568,154 | B2 | 7/2009 | Salesin et al. | |
| 7,619,616 | B2 * | 11/2009 | Rimas Ribikauskas et al. ............................. | 345/173 |
| 2005/0091254 | A1 * | 4/2005 | Stabb et al. ................... | 707/102 |
| 2006/0253795 | A1 * | 11/2006 | Titov et al. .................... | 715/786 |
| 2008/0120534 | A1 | 5/2008 | Moore | |
| 2009/0070707 | A1 * | 3/2009 | Schaller et al. ............... | 715/787 |
| 2010/0162161 | A1 * | 6/2010 | Lin et al. ....................... | 715/786 |

OTHER PUBLICATIONS

"New York Times Reader FAQ", http://www.nytimes.com/membercenter/faq/timesreader.html (last accessed Dec. 1, 2008).
"Using Adobe(R) Buzzword(R)", http://help.adobe.com/en_US/Acrobat.com/Buzzword/buzzword_help.pdf (last accessed Oct. 16, 2008).
U.S. Appl. No. 12/325,344, filed Dec. 1, 2008, entitled Methods and Systems for Page Layout Using a Virtual Art Director, Daniel Wabyick and Justin Van Slembrouck, Inventors.
Office Action dated May 27, 2011 in U.S. Appl. No. 12/325,344.
Office Action dated Dec. 20, 2011 in U.S. Appl. No. 12/325,344, 32 pages.

* cited by examiner

*Primary Examiner* — Tuyetlien Tran
*Assistant Examiner* — Anil Bhargava
(74) *Attorney, Agent, or Firm* — Kilpatrick Townsend & Stockton LLP (57) ABSTRACT

A layout can identify placement of a plurality of content units of a document across one or more pages with each page representing a display area for displaying the content of the document. A scrollbar definition can be generated so as to identify a plurality of equally-sized segments of a scrollbar track, with each segment corresponding to a respective one of the pages of the document. The definition can identify a scrollbar thumb having a body that fills a segment. A scrollbar can be rendered based on the definition. The scrollbar definition can be updated to identify a different number of segments of the scrollbar based on a new number of pages in a new layout generated in response to a change in the size of the display area.

25 Claims, 8 Drawing Sheets

METHODS AND SYSTEMS FOR PAGE NAVIGATION OF DYNAMICALLY LAID-OUT SYSTEMS

TECHNICAL FIELD

The disclosure below generally relates to navigating computer-generated content, particularly rendering one or more scrollbars for navigating pages and/or indicating page position.

BACKGROUND

Software applications are often used to view content that occupies a greater area than is available for display on a screen at a given time. For example, a document edited or viewed in a word processor, web browser, or text editor may include lines of text or other visual content that extend beyond the vertical and/or horizontal space on the screen. A graphical user interface can render a scrollbar for use in adjusting the portion of the content that is in view of the screen.

A display area may only depict a portion of the total area occupied by the content. A vertical scrollbar may be used to change which portion of the total area is depicted in the display area and/or a horizontal scrollbar may be used.

A typical scrollbar can comprise an elongated area that is referred to as a "track" and extends in the direction for which scrolling is to be controlled (e.g., for vertical scrolling, the track is vertical). The track contains an element that can be moved in the track to indicate the relative position of the displayed area to the full length or width of the document (in the horizontal or vertical direction as the case may be). This element is referred to as a "thumb" herein and in the art, but is also referred to in the art as a 'knob," "scroll box," "elevator," "grip," and by numerous other designations. The track may include arrows or other interface components for slight adjustment to the position of the thumb in the track such as up/down arrows. The track may be responsive to user gestures such as clicks—e.g. in some applications, clicking in the track above the thumb results in upward scrolling while clicking in the track below the thumb results in downward scrolling (with similar features for horizontal scrollbars).

Despite the ubiquity of scrollbars, there remains a need for improvement in navigation options for electronically-viewed documents.

SUMMARY

Embodiments can comprise accessing a layout specifying how of a plurality of content units of a document will be displayed in one or more pages. Each page can correspond to a display area. The method can comprise generating a scrollbar definition, the scrollbar definition identifying a plurality of equally-sized segments of a scrollbar track, each segment corresponding to a respective one of the pages of the document.

Data may be provided that indicates a new layout that changes the number of pages in response to a change in the display area. The scrollbar definition can be updated to identify a different number of segments of the scrollbar based on the number of pages of the new layout and an updated scrollbar can be rendered based on the updated scrollbar definition.

For example, a user interface component may receive user input changing the size of the display area and may request a new layout based on the new size of the display area. The user interface component may update the scrollbar based on determining a new number of pages in the layout provided in response to the request.

In some embodiments, a document page can be displayed in a display area and a pagination user interface indicating the displayed page can be rendered adjacent to the display area. In response to data representing a gesture to change a first page (i.e. the currently-displayed page) to a second page, the currently-displayed area can be scrolled from the first page to the second page. While the currently-displayed area is scrolled, the pagination user interface is rendered to be semi-transparent.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures, in which use of like reference numerals in different features is intended to illustrate like or analogous components.

DETAILED DESCRIPTION

Reference will now be made in detail to various and alternative exemplary embodiments and to the accompanying drawings, with like numerals representing substantially identical structural elements. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

As noted above, the present subject matter relates to the use of scrollbars for navigating electronically-viewed documents. Scrollbars configured in accordance with aspects of the present subject matter may be particularly effective for navigating documents whose layout changes dynamically. Several examples relate to handling layout changes in response to changes in an available display area without changes to the space required by individualized content units. However, the principles discussed herein can be used in any context in which a scrollbar can be used for navigation and in which page data is available.

Figure 1:
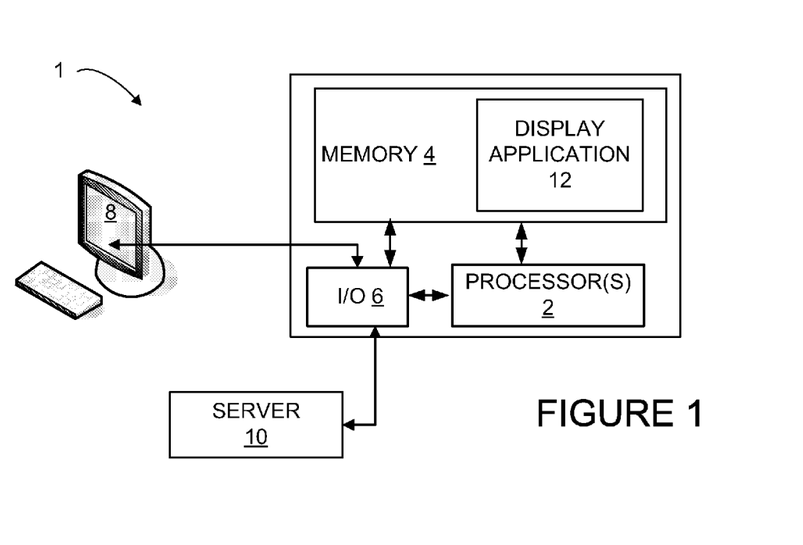
FIG. 1 is a block diagram of an exemplary computing system that may implement a scrollbar.

FIG. 1 illustrates an example of a computer system 1 that may provide embodiments of a scrollbar. For instance, computer system 1 comprises one or more processors 2 which execute instructions accessed from memory 4. A display application 12 may comprise instructions stored in memory 4 and may reside in memory 4 when executed. The scrollbar may be displayed based on application-specific code or may be an element of another component such as an operating system and may be used along with other interface components to control how display application displays content.

I/O components 6 are used to interface with a keyboard and monitor 8 in this example to receive user input and provide output. I/O components 6 are also operative to communicate with a server 10 to obtain content for display application 12 to display, although such content could be locally sourced. Additionally, I/O components 6 could be used to access additional memory, remote storage, or other resources.

Figure 2:
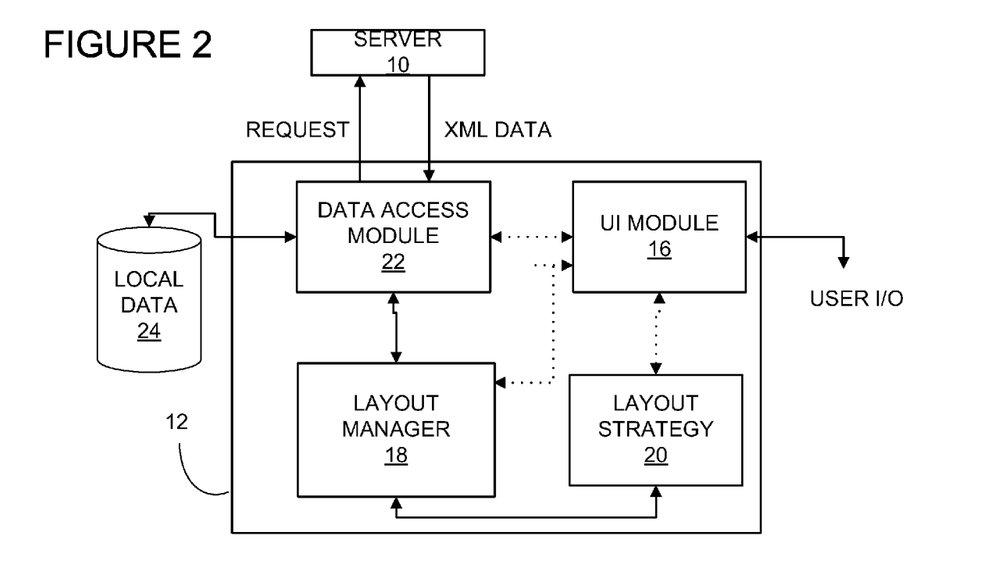
FIG. 2 is a block diagram illustrating an example of a device implementing a scrollbar via computer software.

FIG. 2 is a block diagram illustrating exemplary components of a display application 12 in closer detail. For example, display application 12 may comprise a browser, news reader, or other application that can access server 10 over the Internet to receive XML data comprising content to display. Server 10 may be maintained by a content publisher in some embodiments.

In this example, display application 12 comprises a plurality of modules provided by a computer system, such as computer system 1 noted above. A computer system may correspond to any number of devices, including (but not limited to) a desktop or laptop computer, mobile phone, music player, or smart television or set-top box, for instance.

The modules include a layout manager 18 for controlling placement of individualized content units based on a layout strategy 20. Layout strategy 20 may be maintained locally or may be obtained from server 10 along with the content to be displayed (or could be obtained from another source). In this example, the individualized content units are retrieved from a local store 24 and are displayed by a user interface module 16 that renders the individualized content units in a form for consumption by one or more users based on layout decisions made by layout manager 18.

User interface module 16 may be configured to generate a scrollbar definition, render a scrollbar, and receive user gestures (e.g. clicks, dragging, etc.) indicating various commands, including commands to change the size of a display area and to change which page of a document is currently displayed.

Although the examples discussed herein relate to displaying a document comprising data from a single source, it will be understood that the teachings herein are not limited and could be adapted for use when displaying a document comprising content from multiple sources (e.g., data from different data feeds displayed in a single document). Additionally, although the layout management techniques discussed herein may be suitable for use in display of content from online sources, the techniques are applicable regardless of source. For example, the scrollbar could be rendered for use with an application such as a word processor, presentation tool, or other publishing tool operating on local data.

Generally speaking, layout manager 18 can be configured to access content to display and a given area and determine positions for the content based on parameters set by a user and/or a publisher. Afterwards, the layout manager can evaluate a given layout to ensure that the content, when displayed, does extend beyond an available display area and, if that is the case, move some or all of the content to another page.

Additional details regarding exemplary dynamic layout techniques that may be implemented by layout manager 18 can be found in U.S. patent application Ser. No. 12/325,344 by Daniel Wabyick and Justin Van Slembrouck, titled "METHODS AND SYSTEMS FOR PAGE LAYOUT USING A VIRTUAL ART DIRECTOR" and filed on the same date as the present specification. The application "METHODS AND SYSTEMS FOR PAGE LAYOUT USING A VIRTUAL ART DIRECTOR" is hereby incorporated in reference in its entirety. However, embodiments of the present subject matter can be used regardless of the particular technique(s) used to generate a layout.

Figure 3:
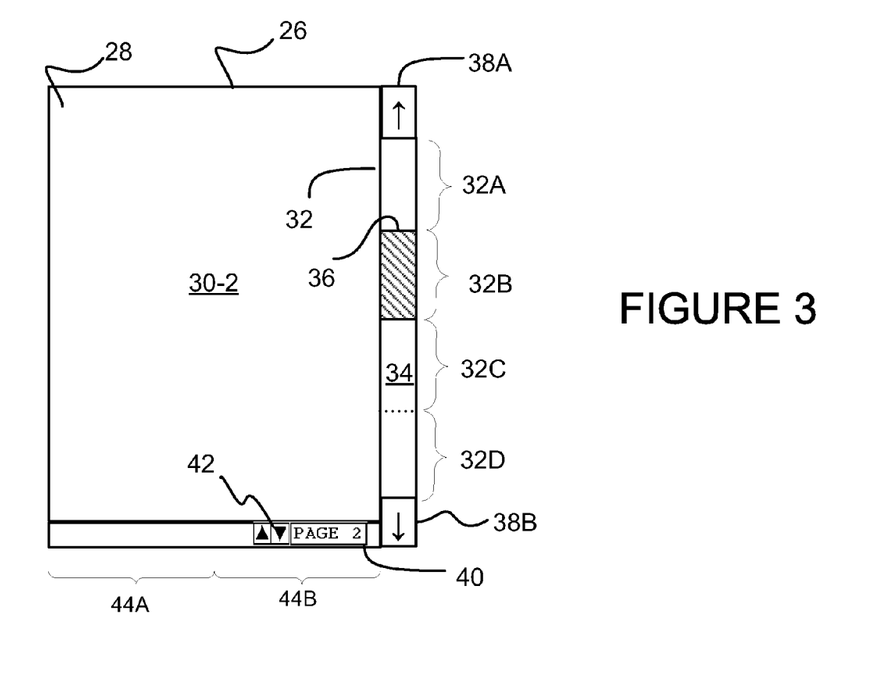
FIG. 3 illustrates an example of a scrollbar in accordance with aspects of the present subject matter.
Figure 4:
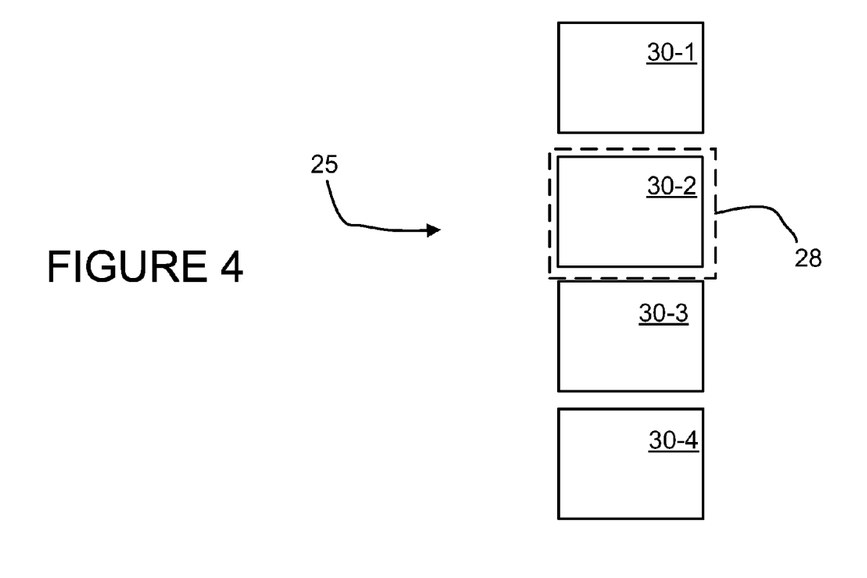
FIG. 4 illustrates a layout used to generate the scrollbar shown in FIG. 3.

FIG. 3 illustrates an exemplary embodiment of a scrollbar 32 as part of a window 26. FIG. 4 shows a corresponding layout view 25 that depicts the layout of pages that can be displayed in window 26. Layout 25 is used herein for purposes of illustration to represent how a scrollbar is defined, but may be provided as a "layout view" in some embodiments.

In this example, scrollbar 32 is a vertical scrollbar and comprises a thumb 36 and track 34. Additionally, scrollbar 32 includes an up arrow 38A and down arrow 38B which can be used for scroll up and down commands, respectively. In addition to scrollbar 32, FIG. 2 depicts a display area 28 and a pagination interface 40 featuring page up/down controls 42, which in some embodiments may be used to change the content displayed in display area 28. If a pagination interface is used, then arrows 38A/38B may be omitted in some embodiments.

In this example, display area 28 comprises two columns 44A and 44B, which may be considered by a layout manager in some embodiments in determining an appropriate layout that fills, but does not exceed, display area 28. Instead of content exceeding display area 28, the content can be allocated across multiple pages 30-1, 30-2, 30-3, and 30-4, which are sized so that content on a page does not exceed display area 28 as shown in layout 25 of FIG. 4. Display area 28 is indicated as coextensive with page 30-2 in layout view 25

Figure 5:
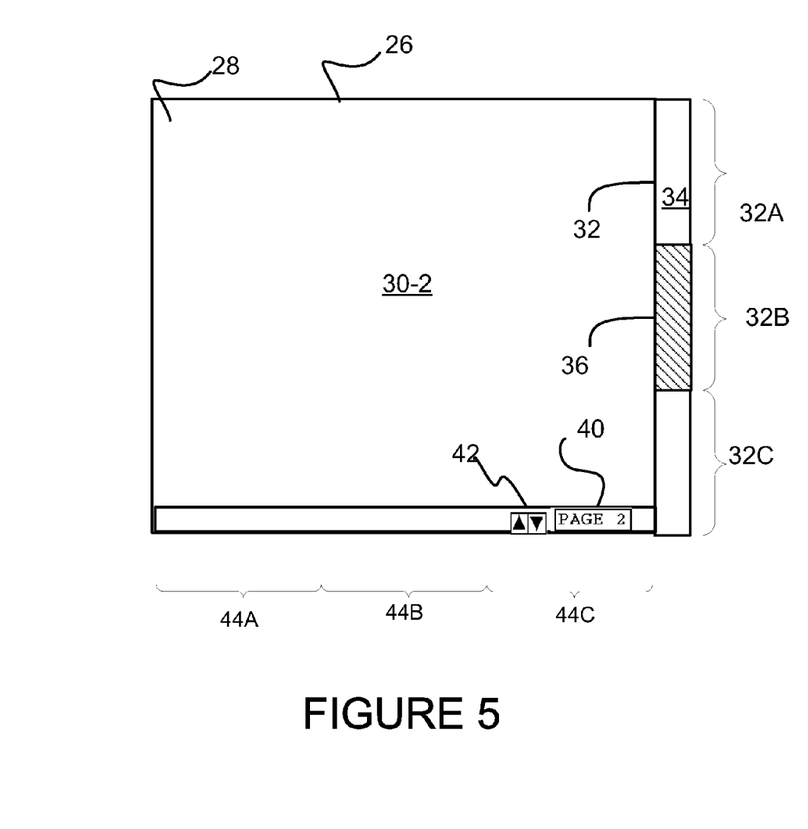
FIG. 5 illustrates an example of the scrollbar of FIG. 3 after updating due to a change in the size of a display area.
Figure 6:
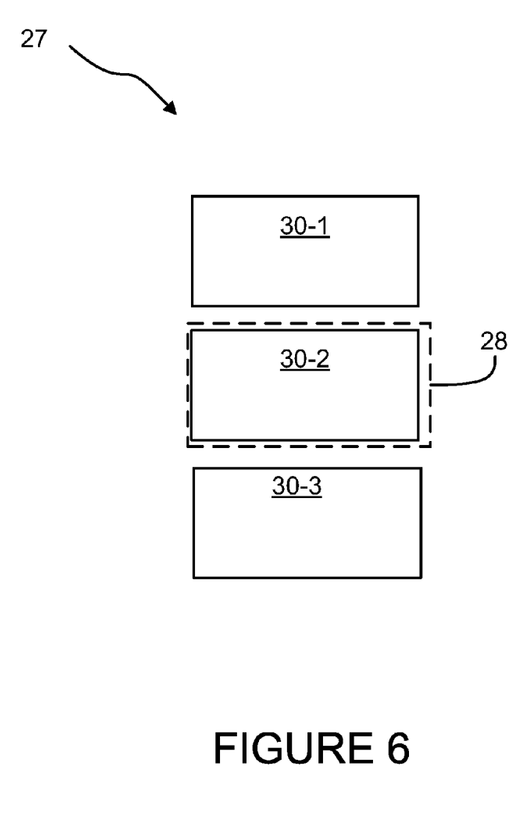
FIG. 6 illustrates a layout used to generate the scrollbar shown in FIG. 5.

The layout may change in response to changes in the effective size of display area 28. For example, a user may resize window 26 to increase the display area and a device displaying the content can generate a new layout. FIG. 5 shows an example where the width of the display area has been increased by half as indicated by the increased width of window 26 with an additional column 44C now shown. As shown by layout 27 of FIG. 6, the change in the size of the display area has resulted in a change to the layout so that content has been re-allocated across three pages 30-1, 30-2, and 30-3. This example also illustrates a variant of scrollbar 32 that does not include an up arrow 38A and down arrow 38B.

Other changes in the display area can include an increase or decrease in the height of the display area in addition to or instead of changes to the width. As another example, a reduction in the size of the display area may result in the number of pages increasing as content is reallocated.

Figure 7:
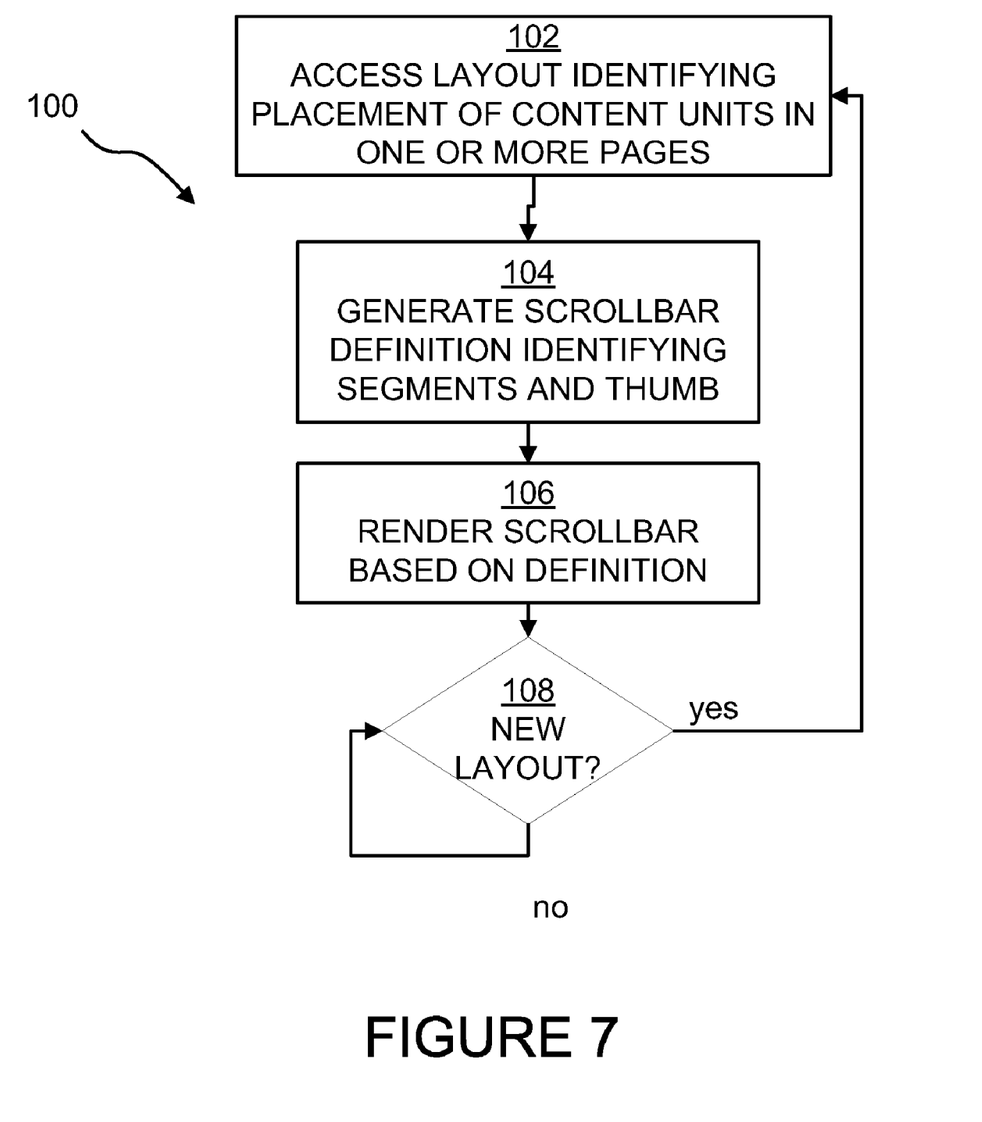
FIG. 7 is a flowchart showing an exemplary method for defining a scrollbar.

FIG. 7 is a flowchart illustrating an exemplary method 100 for providing a scrollbar such as can be implemented by UI module 16. Block 102 represents accessing a layout identifying placement of content units in one or more pages. Each page can represent a display area for displaying the content of a document. For example, UI module 16 may request a layout from layout manager 18. Block 104 represents generating a scrollbar definition that identifies a plurality of segments along the length of the scrollbar and a scrollbar thumb.

For example, UI module 16 may determine a length of the scrollbar and divide the length into a plurality of equally-sized segments, with each segment corresponding to a respective one of the pages of the document as determined from the layout. For instance, turning back to FIGS. 3 and 4, layout 25 includes four pages and so scrollbar 32 features four segments 32A, 32B, 32C, and 32D.

In some embodiments, the scrollbar thumb can be defined as a body that fills a segment. For example, the length and width of the scrollbar thumb can be defined so that, when positioned entirely within a segment, the thumb fills or completely fills the segment. In some embodiments, the thumb may sit inside the segment or slightly overlap the boundaries of the segment depending on graphic effects. In other embodiments, the scrollbar thumb does not fill an entire segment.

Block 106 represents rendering the scrollbar based on the scrollbar definition. For example, UI module 16 can output data to one or more displays so that a vertical scrollbar track is rendered adjacent or near the left or right side of the displayed area, with the displayed area displaying one of the pages of the document. The scrollbar track may be rendered with annotations that identify the border between segments. Turning back to FIG. 3, a border between segments 32C and 32D appears as a dotted line. Other annotations could include page numbers or labels that appear in the scrollbar track. The thumb may be rendered in the segment of the scrollbar track corresponding to the displayed page. If the layout specifies only a single page, no thumb is rendered in some embodiments.

In addition to the scrollbar, in some embodiments a pagination interface such as the pagination interface 40 illustrated in FIGS. 3 and 5 in order to provide an alternative to the scrollbar. Additionally or alternatively, the scrollbar may include up and down arrows (or left and right arrows for a horizontal scrollbar).

Block 108 represents waiting for data indicating a change to the layout that changes the page division. For example, in some embodiments, the layout is changed in response to a change in the display area so that the content units of the document are allocated across a different number of pages. For instance, UI module 16 may receive a user gesture resizing a window and request a new layout. As shown in FIG. 7, if a new layout is indicated, then the method loops back to block 102. This represents updating the scrollbar definition to identify a different number of segments based on the number of pages in the new layout. Then, an updated scrollbar is rendered based on the updated scrollbar definition. If the layout change shifts the currently-displayed page, the thumb can be repositioned.

For instance, FIG. 5 represents an update to scrollbar 32 in light of changes to the width of display area 28. As shown by layout 27 in FIG. 6, the content is allocated to three pages instead of the four pages in layout 25 of FIG. 4. Thus, scrollbar 32 in FIG. 5 has been updated to include three segments 32A, 32B, and 32C.

Figure 8:
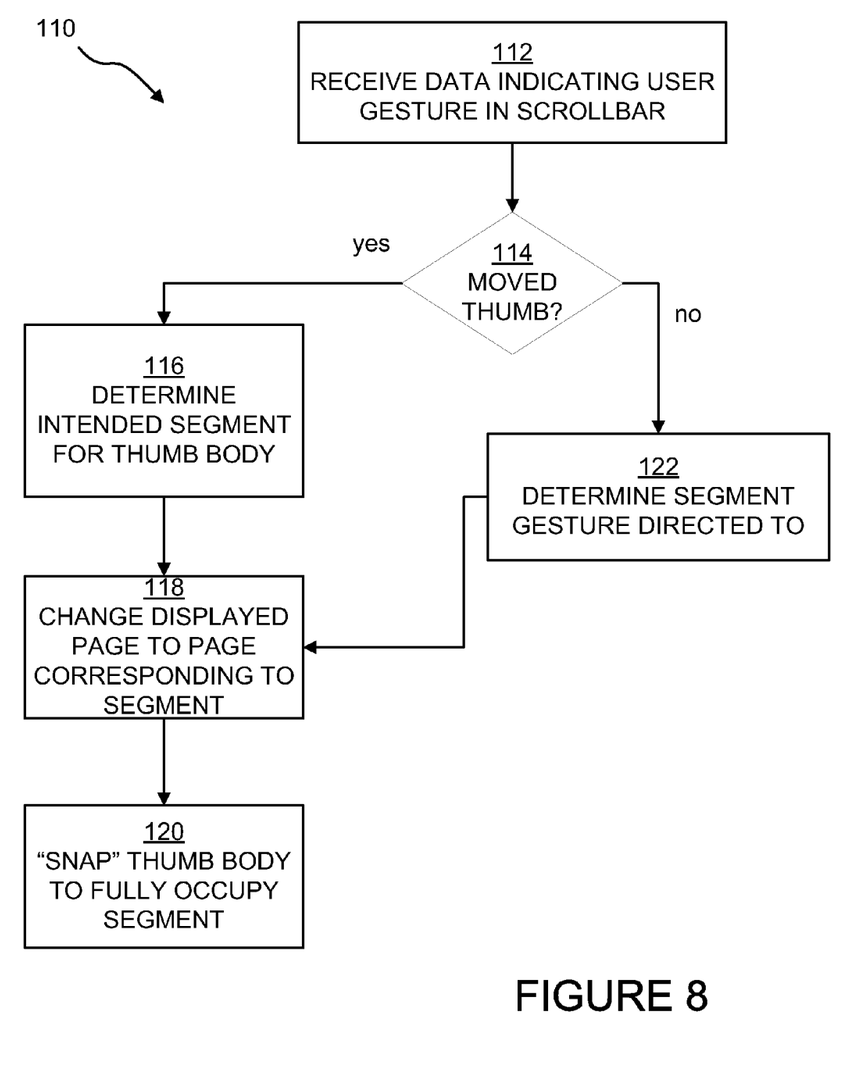
FIG. 8 is a flowchart showing exemplary techniques for handling user input via a scrollbar.

FIG. 8 illustrates an exemplary method 110 of receiving user input indicating a page to display via a scrollbar. Block 112 represents receiving data indicating a user gesture in a scrollbar. For example, the user may click on a segment of the scrollbar or move the thumb in some embodiments by clicking and dragging. In this example, block 114 represents determining if the thumb has been moved.

For instance, the user may click on the thumb and drag the thumb into or towards another segment. If so, the page displayed in the display area can be changed to the page of the corresponding segment. This is shown at block 116, where intended segment for the thumb body is determined.

For example, the user may position the thumb partially between two segments, and in this example the segment holding more of the thumb body "wins." As another example, block 116 may represent inferring what page a user intended to scroll to even if the thumb is not mostly inside that respective segment at the end of the gesture. Inferring an intended segment for the scrollbar can comprise analyzing the gesture made with the thumb, such evaluating how far the thumb traveled during the gesture and the timing of the gesture to determine a "velocity" for the thumb during the gesture. This velocity can be correlated to a distance along the scrollbar track to move the thumb based on a drag factor that serves to decrease the velocity of the thumb once it is "thrown" down the track. For example, the velocity may be decreased a given amount per segment traversed by the thumb and/or by a given amount per length of the track the thumb traverses. Additionally, the thumb may be stopped once it reaches an end of the track.

Figure 9:
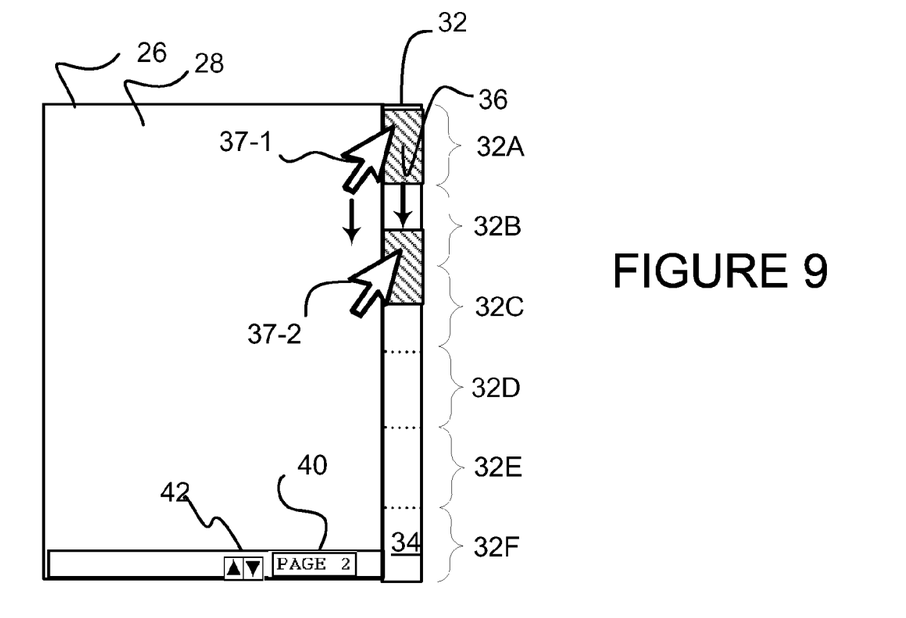
FIGS. 9 and 10 illustrate an example of a user gesture changing the position of a thumb in a scrollbar.
Figure 10:
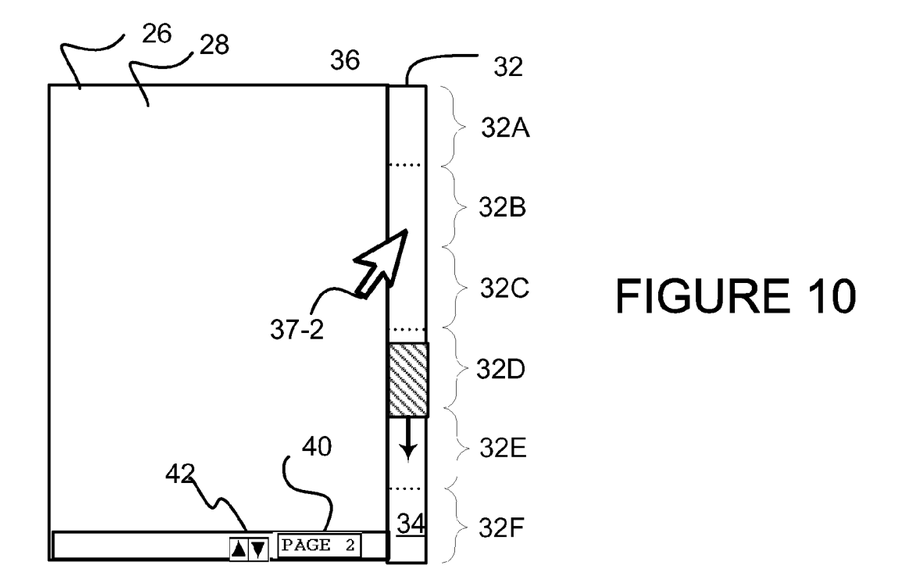

An example of "throwing" the thumb down a track 34 comprising six segments 32A to 32F is shown in FIGS. 9 and 10. FIG. 9 illustrates a gesture in which a cursor 37 is moved from a first position (37-1) to a second position (37-2). For example, the user may click on thumb 36 while the cursor is at position 37-1 and drag the cursor and thumb and then release the thumb (by un-clicking, for example) when the cursor reaches position 37-2. As shown in FIG. 10, however, thumb 36 may continue moving to a further position in track 34.

Returning to FIG. 8, at block 118, the displayed page is changed to the page corresponding to the segment, and at block 120 the thumb body is "snapped" to fully occupy the segment. For example, if the thumb body is across a border between two segments when the user ends the dragging gesture (e.g., by releasing the mouse button), then once the appropriate segment is determined, the thumb can be rendered in the appropriate segment without further action by the user. Animation may be used to simulate a rapid change in thumb position or the new position may immediately follow the old position.

Returning to block 114, instead of dragging the thumb, the user may have gestured toward a segment of the scrollbar track. If so, at block 122 the method determines which segment the gesture was directed to (e.g., which segment the user clicked in). Then, at block 118, the displayed page is changed to the corresponding segment and at block 120 the thumb is snapped into location.

FIG. 11 again shows window 26 with displayed area 28 and scrollbar 32 (including track 34 and thumb 36) as shown in FIG. 5 based on layout 27. However, this example is provided to illustrate another exemplary user interface effect where displayed content is scrolled between page changes.

Figure 11:
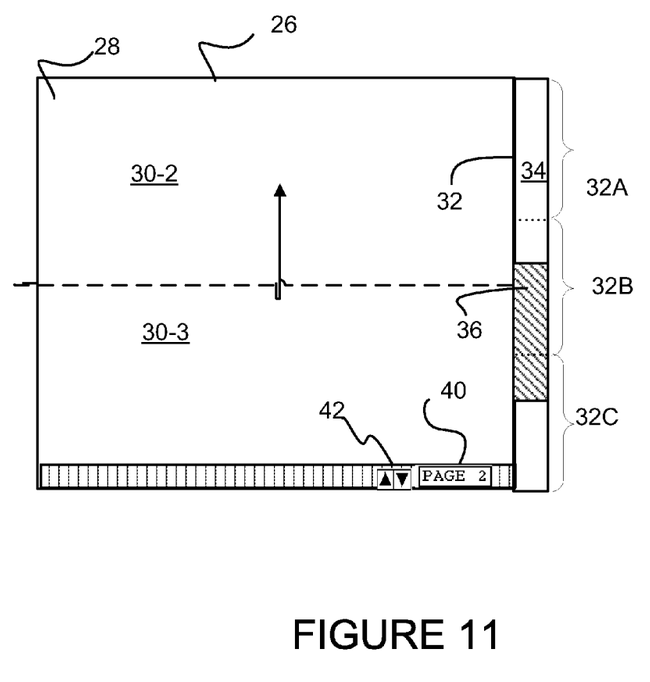
FIG. 11 illustrates an example of a scrolling effect.
Figure 12:
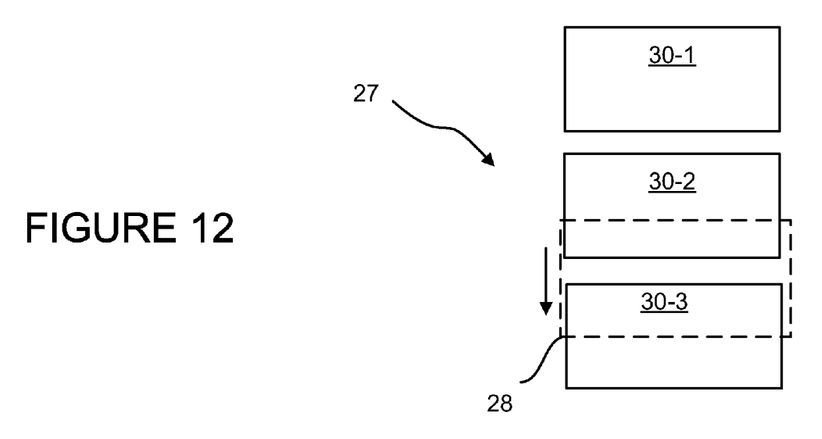
FIG. 12 illustrates the layout used to generate the display of FIG. 11.

In this example, the user interface has received a command indicating a change from page 30-2 to page 30-3. For example, a user may have clicked on page controls 42 to advance from page 2 to page 3. In both window 26 and layout 27 in FIG. 12, displayed area 28 is shown in motion to represent a scrolling effect. The scrolling effect is illustrated in window 26 by upward motion by pages 30-2 and 30-3. Thumb 36 may be moved downward while content scrolls upward. Pagination interface 40 has not updated its page indicator in this example; the page indicator page may be blank while pages are in motion.

As indicated by the cross-hatching, in some embodiments pagination interface 40 may persist while scrolling but may be rendered transparent or semi-transparent. Thus, the pagination interface may appear to "float" while the content scrolls beneath. In some embodiments, pagination interface 40 persists while a page is displayed, while in other embodiments pagination interface 40 is hidden unless a user gestures toward the interface (e.g., by hovering over the bottom of display area 26 with a cursor).

Figure 13:
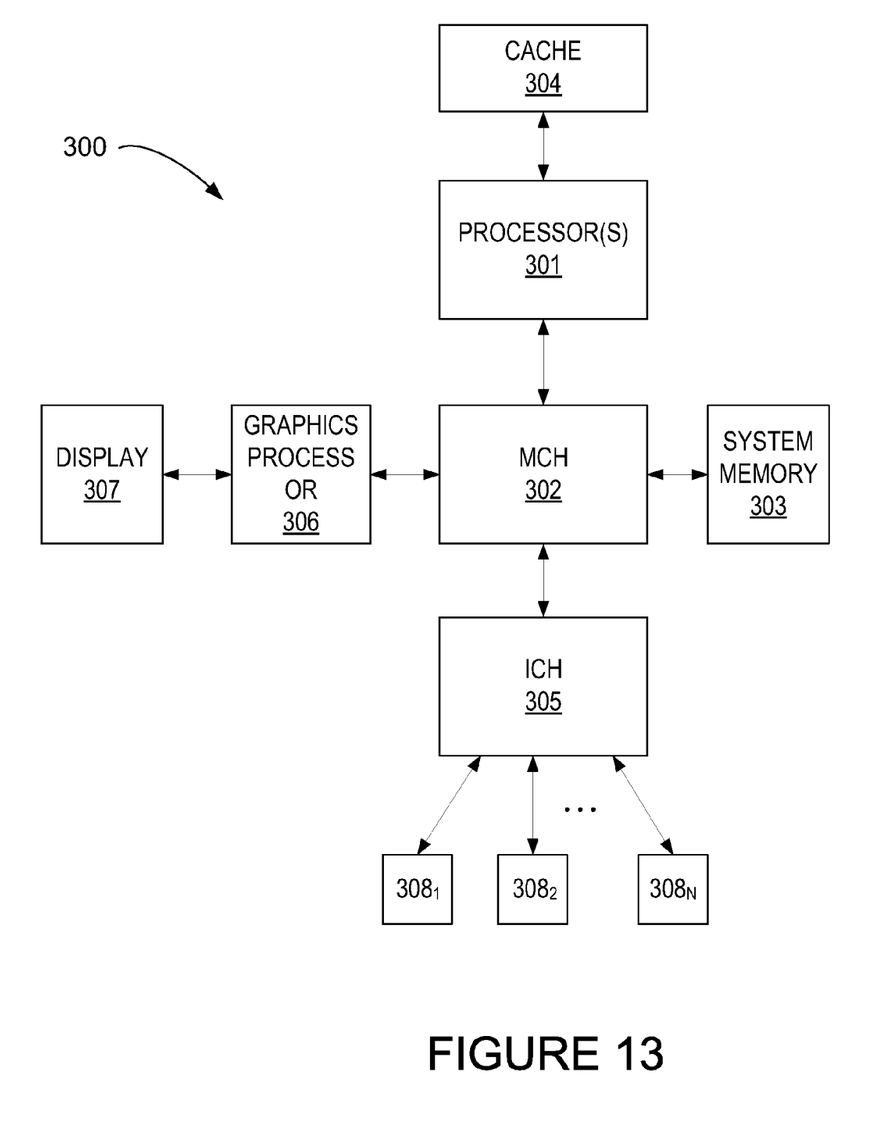
FIG. 13 is a block diagram illustrating components of an exemplary computing device.

FIG. 13 illustrates an example of computing device 300 suitable for implementing embodiments of the methods and systems as described in the examples above. For example, computer system 1 of FIG. 1 may comprise one or more computing devices 300.

The exemplary computing system of FIG. 13 includes: 1) one or more processors 301; 2) a memory control hub (MCH) 302; 3) a system memory 303 (of which different types exist such as DDR RAM, EDO RAM, etc,); 4) a cache 304; 5) an I/O control hub (ICH) 305; 6) a graphics processor 306; 7) a display/screen 307 (of which different types exist such as Cathode Ray Tube (CRT), Thin Film Transistor (TFT), Liquid Crystal Display (LCD), DPL, etc.); and/or 8) one or more I/O devices 308.

The one or more processors 301 execute instructions in order to perform whatever software routines the computing system implements. The instructions frequently involve some sort of operation performed upon data. Both data and instructions are stored in system memory 303 and cache 304. Cache 304 is typically designed to have shorter latency times than system memory 303. For example, cache 304 might be integrated onto the same silicon chip(s) as the processor(s) and/or constructed with faster SRAM cells while system memory 303 might be constructed with slower DRAM cells. By tending to store more frequently used instructions and data in the cache 304 as opposed to the system memory 303, the overall performance efficiency of the computing system improves.

System memory 303 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 303 prior to their being operated upon by the one or more processor(s) 301 in the implementation of a software program. Similarly, data that a software program determines should be sent from the computing system to an outside entity through one of the computing system interfaces, or stored into an internal storage element, is often temporarily queued in system memory 303 prior to its being transmitted or stored.

The ICH 305 is responsible for ensuring that such data is properly passed between the system memory 303 and its appropriate corresponding computing system interface (and internal storage device if the computing system is so designed). The MCH 302 is responsible for managing the various contending requests for system memory 303 access amongst the processor(s) 301, interfaces and internal storage elements that may proximately arise in time with respect to one another.

One or more I/O devices 308 are also implemented in a typical computing system. I/O devices generally are responsible for transferring data to and/or from the computing system (e.g., a networking adapter); or, for large scale non-volatile storage within the computing system (e.g., hard disk drive). ICH 305 has bi-directional point-to-point links between itself and the observed I/O devices 308.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, but also application-specific integrated circuits and other programmable logic, and combinations thereof. Any suitable programming, scripting, or other type of language or combinations of languages may be used to implement the teachings contained herein in software.

Embodiments of the methods disclosed herein may be executed by one or more suitable computing systems. Such system(s) may comprise one or more computing devices adapted or configured to perform one or more embodiments of the methods disclosed herein. The order of the blocks presented in the examples above can be varied—for example, blocks can be re-ordered, combined, and/or broken into sub-blocks. Certain blocks or processes can be performed in parallel.

As noted above, such devices may access one or more computer-readable media that embody computer-readable instructions which, when executed by at least one computer, cause the at least one computer to implement one or more embodiments of the methods of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components, including communication over a network. It should be appreciated that such network communications may occur over any suitable number or type of networks, including, but not limited to, a dial-in network, a local area network (LAN), wide area network (WAN), public switched telephone network (PSTN), the Internet, an intranet or any combination of hard-wired and/or wireless communication links.

Any suitable computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices, and the like.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A computer system comprising:
  a processor for executing instructions stored in a non-transitory computer-readable medium providing an application; and
  wherein the application comprises:
    a data access module configured to perform the operation of accessing content of a document; and
    a user interface module configured to perform the operations of
      accessing a layout allocating the content across one or more pages, each page corresponding to a different portion of the content to be displayed in a display area when each respective page is displayed in the display area,
      using the layout to generate a scrollbar definition, and
      wherein the scrollbar definition identifies a plurality of equally-sized segments of a scrollbar track, each segment corresponding to a respective page;
    wherein the user interface module displays a page in the display area with a scrollbar, the scrollbar displayed using the scrollbar definition, and
    wherein the user interface module accesses a new layout and updates the scrollbar definition in response to a change in a size of the display area.

2. The system set forth in claim 1, wherein the scrollbar definition specifies a scrollbar thumb.

3. The system set forth in claim 2, wherein the user interface module renders the scrollbar thumb in the segment of the scrollbar track corresponding to the page displayed in the display area.

4. The system set forth in claim 2, wherein the user interface module is configured to receive data indicating a gesture in one of the segments of the scrollbar track and change the page displayed in the display area to the page corresponding to segment of the scrollbar track to which the gesture was directed.

5. The system set forth in claim 2, wherein the user interface module is configured to:
  receive data indicating a gesture moving the scrollbar thumb so that, at the end of the gesture, a body of the scrollbar thumb extends across a boundary between two segments of the scrollbar track;
  determine which track segment holds a greater part of the body of the scrollbar thumb; and
  change the page displayed in the display area to a page corresponding to the track segment holding a greater part of the body of the scrollbar thumb.

6. The system set forth in claim 2, wherein the user interface module is configured to:
  receive data indicating a gesture moving the scrollbar thumb;
  determine a thumb velocity based on the gesture;
  determine a distance traveled by the thumb in the scrollbar track based on the thumb velocity and a drag factor; and
  change the page displayed in the display area to a page corresponding to the track segment at which the thumb arrives after traveling the distance.

7. The system set forth in claim 1, wherein the scrollbar definition specifies one or more annotations to be displayed on the scrollbar track identifying borders between the segments of the scrollbar track.

8. The system set forth in claim 1, wherein the portion of the content to be displayed in a display area when each respective page is displayed in the display area changes in response to a change in a size of the display area.

9. A non-transitory computer-readable medium embodying program code executable by a computer system, the computer-readable medium comprising:
  program code for generating a scrollbar definition, the scrollbar definition identifying a plurality of equally-sized segments of a scrollbar track, each segment corresponding to a respective page of a layout for displaying content of a document in a display area, each page corresponding to a different portion of the content to be displayed in the display area when each respective page is displayed in the display area;
  program code for rendering a scrollbar based on the scrollbar definition, including rendering the scrollbar track;
  program code for receiving a user gesture changing the size of the display area to a different size;
  program code for requesting, in response to the user gesture, a new layout and determining a new number of pages of the new layout returned in response to the request;
  program code for updating the scrollbar definition to identify a different number of segments of the scrollbar based on the new number of pages; and
  program code for rendering an updated scrollbar based on the scrollbar definition as updated.

10. The non-transitory computer-readable medium set forth in claim 9, further comprising:
  program code for displaying a first page of the document in the display area; and
  program code for rendering a scrollbar thumb in the segment of the scrollbar track corresponding to the first page.

11. The non-transitory computer-readable medium set forth in claim 10, further comprising:
  program code for receiving data indicating a second page of the document to display; and
  program code for updating the rendering of the scrollbar thumb so that the scrollbar thumb is in the segment of the scrollbar track corresponding to the second page to display.

12. The non-transitory computer-readable medium set forth in claim 11, wherein receiving data indicating a second page to display comprises receiving data indicating a user gesture in one of the segments of the scrollbar track corresponding to the second page to display.

13. The non-transitory computer-readable medium set forth in claim 11, wherein receiving data indicating a second page to display comprises:
   receiving a user gesture moving the scrollbar thumb so that, at the end of the gesture, a body of the scrollbar thumb extends across a boundary between two segments of the scrollbar track; and
   determining which track segment holds a greater part of the body of the scrollbar thumb, the track segment holding a greater part of the body of the scrollbar thumb corresponding to the second page to display.

14. The non-transitory computer-readable medium set forth in claim 11, wherein receiving data indicating a second page to display comprises:
   receiving a user gesture moving the scrollbar thumb;
   determining a thumb velocity based on the gesture; and
   determining a distance traveled by the thumb in the track based on the thumb velocity and a drag factor;
   wherein the second page to display corresponds to a track segment at which the thumb arrives after traveling the distance.

15. A computer-implemented method comprising:
   accessing a layout identifying an allocation of content of a document across one or more pages, each page corresponding to a different portion of the content to be displayed in a display area when each respective page is displayed in the display area;
   generating a scrollbar definition, the scrollbar definition identifying a plurality of equally-sized segments of a scrollbar track, each segment corresponding to a respective page;
   rendering a scrollbar based on the scrollbar definition, including rendering the scrollbar track;
   in response to a change in the display area, accessing data indicating a new layout that changes the allocation of content so that the content is allocated across a different number of pages;
   updating the scrollbar definition to identify a different number of segments of the scrollbar based on the different number of pages of the new layout; and
   rendering an updated scrollbar based on the scrollbar definition as updated.

16. The computer-implemented method set forth in claim 15, further comprising:
   displaying a first page in the display area;
   rendering a scrollbar thumb in the segment of the scrollbar track corresponding to the first page.

17. The computer-implemented method set forth in claim 16, further comprising:
   receiving data indicating a second page to display;
   updating the rendering of the scrollbar thumb so that the scrollbar thumb is in the segment of the scrollbar track corresponding to the second page to display.

18. The computer-implemented method set forth in claim 17, wherein receiving data indicating a second page to display comprises receiving data indicating a user gesture in one of the segments of the scrollbar track corresponding to the second page to display.

19. The computer-implemented method set forth in claim 17, wherein receiving data indicating a second page to display comprises:
   receiving a gesture moving the scrollbar thumb so that, at the end of the gesture, a body of the scrollbar thumb extends across a boundary between two segments of the scrollbar track; and
   determining an intended segment for the thumb, the intended segment corresponding to the second page to display.

20. The computer-implemented method set forth in claim 19, wherein determining an intended segment for the thumb comprises determining which track segment holds a greater part of the body of the scrollbar thumb at the end of the gesture.

21. The computer-implemented method set forth in claim 19, wherein determining an intended segment for the thumb comprises:
   determining a thumb velocity based on the gesture; and
   determining a distance traveled by the thumb in the track based on the thumb velocity and a drag factor;
   wherein the intended segment corresponds to a track segment at which the body arrives after traveling the distance.

22. The computer-implemented method set forth in claim 15, wherein the display area has a first size; and wherein the method further comprises:
   size, and
   determining a new layout that changes the content of the document across one or more pages based on a set of design rules.

23. The computer-implemented method set forth in claim 15, wherein rendering the scrollbar track comprises rendering a plurality of identifiers indicating the boundary between segments of the scrollbar.

24. The computer-implemented method set forth in claim 15, further comprising displaying a page in the display area; and
   wherein the display area is rendered alongside a pagination user interface bordering the display area, the pagination interface indicating the page displayed in the display area.

25. The computer-implemented method set forth in claim 15, further comprising:
   receiving data representing a gesture to change from display of a first page to a second page; and
   in response to the gesture, scrolling from the first page to the second page in the display area;
   wherein, during scrolling, the pagination interface is rendered to be semi-transparent.

* * * * *